(12) United States Patent
Alcantar et al.

(10) Patent No.: US 12,168,619 B2
(45) Date of Patent: Dec. 17, 2024

(54) COMPOSITIONS AND METHODS TO REMOVE AMMONIA IN FRESHWATER AND SALTWATER FISH STORAGE SYSTEMS

(71) Applicant: University of South Florida, Tampa, FL (US)

(72) Inventors: Norma Arcelia Alcantar, Tampa, FL (US); Wen Zhao, Phoenix, AZ (US)

(73) Assignee: University of South Florida, Tampa, FL (US)

( * ) Notice: Subject to any disclaimer, the term of this patent is extended or adjusted under 35 U.S.C. 154(b) by 1099 days.

(21) Appl. No.: 17/068,199

(22) Filed: Oct. 12, 2020

(65) Prior Publication Data

US 2021/0029977 A1    Feb. 4, 2021

Related U.S. Application Data

(63) Continuation of application No. PCT/US2019/028740, filed on Apr. 23, 2019.

(60) Provisional application No. 62/661,202, filed on Apr. 23, 2018.

(51) Int. Cl.
| | | |
|---|---|---|
| *A01K 63/04* | (2006.01) | |
| *C02F 1/42* | (2023.01) | |
| *C02F 101/16* | (2006.01) | |
| *C02F 103/20* | (2006.01) | |

(52) U.S. Cl.
CPC ............ *C02F 1/42* (2013.01); *C02F 2101/16* (2013.01); *C02F 2103/20* (2013.01); *C02F 2303/16* (2013.01)

(58) Field of Classification Search
CPC ......... A01K 63/04; B01J 20/045; B01J 20/24; B01J 20/3212; B01J 20/3236; B01J 2220/4825; B01J 2220/49; B01J 39/14; B01J 47/016; B01J 49/06; B01J 49/53; C02F 1/288; C02F 1/42; C02F 1/66; C02F 2101/16; C02F 2103/20; C02F 2303/16
See application file for complete search history.

(56) References Cited

U.S. PATENT DOCUMENTS

| | | |
|---|---|---|
| 4,666,610 A | 5/1987 | Kuhns |
| 6,557,492 B1 | 5/2003 | Robohm |
| 2015/0132210 A1 | 5/2015 | Szogi et al. |

FOREIGN PATENT DOCUMENTS

| | | |
|---|---|---|
| WO | 2014145702 A1 | 9/2014 |
| WO | 2014172582 A1 | 10/2014 |

OTHER PUBLICATIONS

Jivan (Year: 2014).*

(Continued)

*Primary Examiner* — Dirk R Bass
(74) *Attorney, Agent, or Firm* — Michele L. Lawson; Smith & Hopen, P.A.

(57) ABSTRACT

Compositions, systems and methods of removing ammonia from fish storage systems are presented. A chemical water conditioner comprised of sodium formaldehyde bisulfite, cornstarch, dye and alcohol was found to have a high ammonia removal efficiency in seawater. A combination of this chemical water conditioner with modified chabazite and phosphate buffer exhibited high ammonia removal efficiency in both seawater and freshwater.

8 Claims, 8 Drawing Sheets

○ Saltwater shrimp control
● Saltwater pinfish and pufferfish with P.S.™
✕ Freshwater bass with B.B.™
✱ Freshwater bass control

(56) References Cited

OTHER PUBLICATIONS

Zhao, Wen. The Control of Water Contaminants Assisted by Natural Materials (2017). Graduate Theses and Dissertations. http://scholarcommons.usf.edu/etd/7114.
International Search Report and Written Opinion issued by the International Searching Authority on Aug. 29, 2019 for corresponding International Patent Application No. PCT/US19/28740 filed Apr. 23, 2019.
International Preliminary Report on Patentability issued by the International Bureau on Oct. 27, 2020 for corresponding International Patent Application No. PCT/US19/28740 filed Apr. 23, 2019.
Hedstrom, Annelie. Ion Exchange of Ammonium in Zeolites: A Literature Review. Journal of Environmental Engineering, Aug. 2001. pp. 673-681.
Aponte-Morales, Veronica et al. Use of Chabazite to Overcome Ammonia Inhibition During Nitrification of High Strength Wastewater. WEFTEC 2014; pp. 1431-1442.
Colella, C. Ion Exchange Equilibria in Zeolite Minerals. Mineral. Deposita 31, 554-562 (1996).
Miladinovic, N. et al. Ammonia Removal from Saline Wastewater by Ion Exchange. Water, Air, and Soil Pollution: Focus 4: 169-177, 2004.
Emadi, H. et al. In vitro Comparison of Zeolite (Clinoptilolite) and Activated Carbon as Ammonia Absorbants in Fish Culture. Naga, The ICLARM Quarterly (vol. 24, Nos. 1 & 2). Jan.-Jun. 2001.
Harnish, R.A. et al. A Review of Polymer-Based Water Conditioners for Reduction of Handling-Related Injury. Rev Fish Biol Fisheries (2011) 21:43-49.
Ivanova, E. et al. Adsorption of Ammonium Ions onto Natural Zeolite. Journal of the University of Chemical Technology and Metallurgy, 45, 3, 2010, 295-302.
Riche, M. and T.J. Pfeiffer. Evaluation of a Sodium Hydroxymethanesulfonate Product for Reducing Total Ammonia Nitrogen in a Small-Scale Rotifer Batch Culture System. North American Journal of Aquaculture, 68:199-205, 2006.

\* cited by examiner

Figure 1A-B

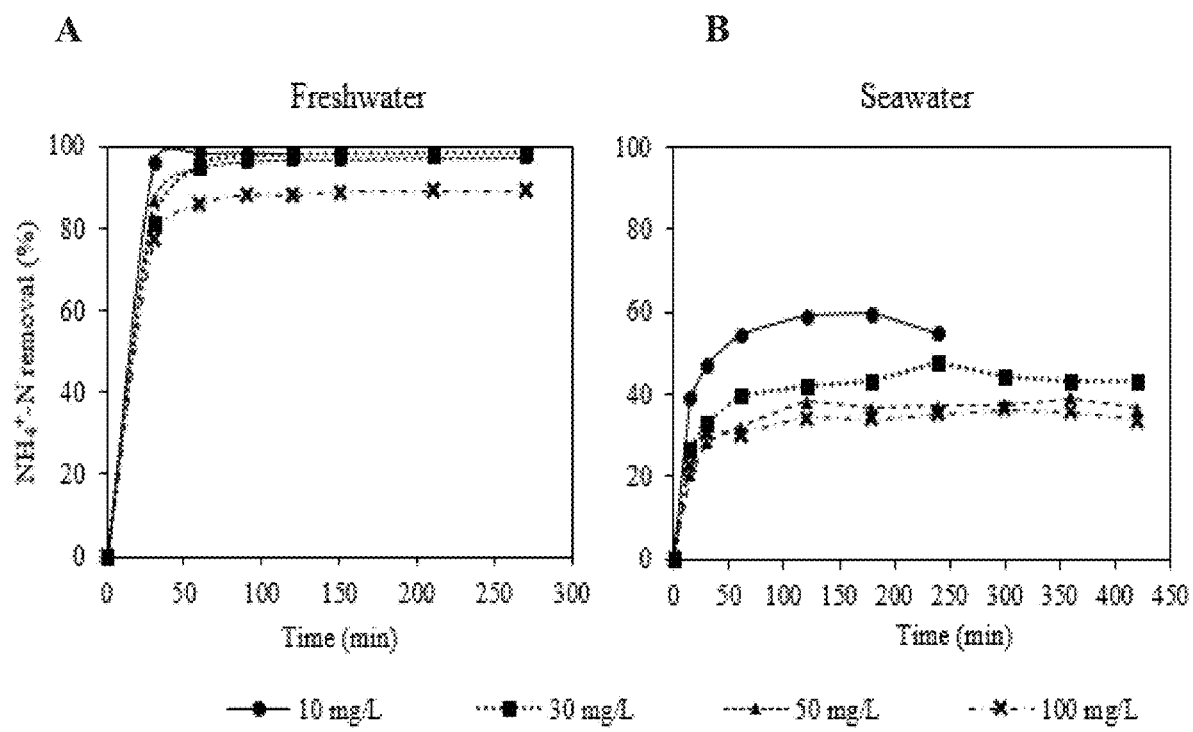
Figure 8A-B

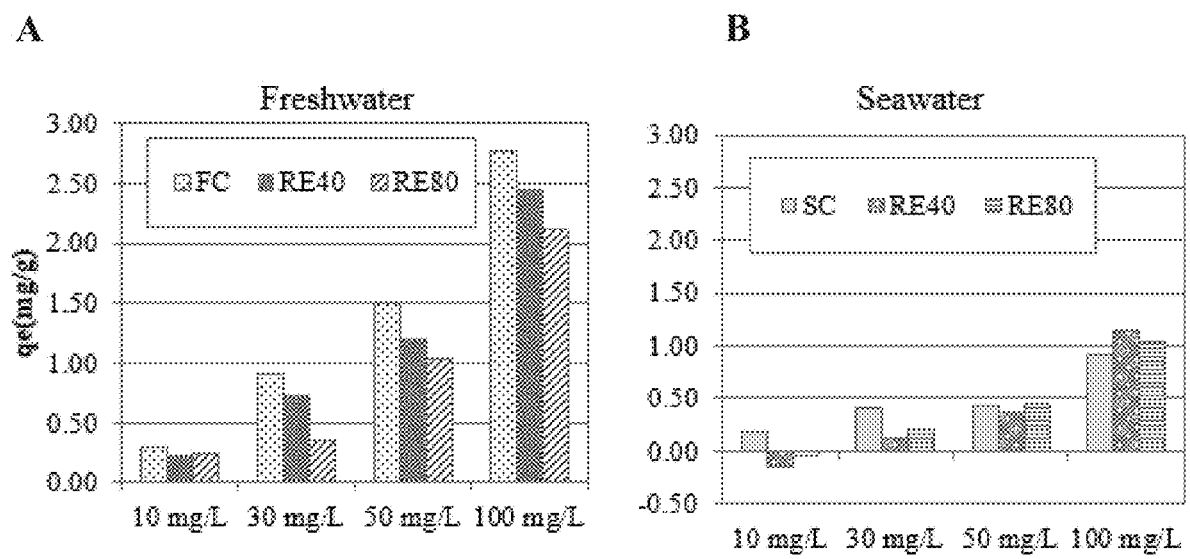
Figure 9A-B

COMPOSITIONS AND METHODS TO REMOVE AMMONIA IN FRESHWATER AND SALTWATER FISH STORAGE SYSTEMS

CROSS REFERENCE TO RELATED APPLICATIONS

This application is a continuation of and claims priority to International Patent Application No. PCT/US2019/028740, entitled "Compositions and Methods to Remove Ammonia in Freshwater and Saltwater Fish Storage Systems, filed Apr. 23, 2019 which claims priority to U.S. Provisional Application No. 62/661,202, entitled "Chemical Compound to Remove Ammonia in Freshwater and Saltwater Fish Storage Systems", filed Apr. 23, 2018; the contents of which are incorporated herein by reference.

GOVERNMENT SUPPORT STATEMENT

This invention was made with Government support under Grant No. 1512225 awarded by the National Science Foundation. The Government has certain rights in the invention.

FIELD OF INVENTION

This invention relates to removal of ammonia from storage systems. Specifically, the invention provides compositions, systems and methods for removing ammonia from fish storage systems.

BACKGROUND OF THE INVENTION

There is a need to store live fish in tanks or closed containers for several reasons including include being able to transport fish while they are alive, maintaining them alive for catch-and-release fishing practices, for raising them in aquaculture farms, or for keeping them in aquariums. Ammonia is one of the major contaminants in fish wastewater. Production of ammonia during the fish metabolism process is toxic to fish health (Levit, 2010). Lethal levels of ammonia can appear within 2-3 hours depending on the number of fish, level of oxygen in the water, amount of water, pH, and temperature. In a normal aquarium system, the ammonia can be controlled by nitrification by maintaining high dissolved oxygen levels to promote aerobic bacterial activity. However, in a fresh-caught fish system or a fish transportation system, the ammonia accumulation rate is much faster than the ammonia oxidation rate by nitrification. Therefore, ammonia needs to be removed directly from the water by using a physical or chemical process.

The physicochemical treatment process of ammonia removal includes ion exchange (IX), adsorption, chemical neutralization (CN), reverse osmosis, electrochemical reduction-oxidation, air stripping and precipitation (Bhatnagar and Sillanpaa, 2011; Boyer, 2014; Khelifi et al., 2002; Mook et al., 2012). Among them, IX and CN are two techniques that are suitable for the fish wastewater application. IX is inexpensive, easy to operate, and renewable, especially if natural materials are used (Emadi et al., 2001; Hedstrom, 2004). CN is easy to implement and has a fast reaction rate (Crittenden et al., 2005).

In terms of the IX method, zeolites are the most widely studied natural ion exchanger for ammonia removal (Hedstrom, 2001; Ivanova et al., 2010). There are many kinds of natural zeolite, such as clinoptilolite and chabazite. Chabazite was reported to have higher ammonia removal efficiency than clinoptilolite (Aponte-Morales et al., 2014). Zeolite traps ammonia and toxic heavy metals in aquaculture wastewater, and it has been intensively studied. Many factors, such as zeolite type, particle size, pretreatment, and wastewater type affect ammonia removal effectiveness (Ghasemi, Sourinejad, et al., 2016).

When using chemical neutralization, commercially available water conditioners are widely accepted as ammonia neutralizers in an aquarium. Optionally, sodium bisulfate salt can react with free ammonia ($NH_3$) to form an amino bisulfate salt that has been used as an ammonia neutralizer in aquariums for decades (Hamish et al., 2011; Kuhns, 1987; Riche et al., 2006).

The recommended methods to control ammonia levels in fish wastewater include adding or replacing with fresh (refill) water, adding commercial water conditioners to the wastewater, or applying ammonia sorbents. There are many commercially available water conditioners claiming to remove ammonia in the fish wastewater, however the actual effectiveness of such commercial conditioners in removing ammonia from fish wastewater has been questioned.

Given the problem with toxicity in fish in storage due to increased ammonia levels in the water, what is needed is a new inexpensive method and chemical to remove ammonia in fish wastewater.

SUMMARY OF INVENTION

The inventors have developed a composition, method and system that is capable of removing ammonia from both freshwater and saltwater fish storage systems. This composition acts as a water conditioner and exhibits several advantages as compared to current commercial water conditioners in the market. The composition reacts with ammonia immediately after being added to the storage system to control its concentration to levels to those which are lower than lethal limits, exhibits higher ammonia removal efficiencies, and remains active in controlling ammonia levels for a longer period of time as compared to that of current technologies.

In an embodiment, a method of manufacturing an ammonia removal agent for use in removing ammonia from seawater is presented comprising: combining an amount of sodium formaldehyde bisulfite, an amount of corn starch, an amount of dye, and an amount of alcohol to form the ammonia removal agent. The amount of the components may be as follows: sodium formaldehyde bisulfite at about 10 g; cornstarch at about 1 g; dye, which may be blue pond dye, may be about 0.15 g; and alcohol may be about 1 mL. Amounts may change according to the size of the storage container, amount of fish contained therein, and frequency of addition to the storage container.

In an embodiment, a system for removing ammonia from seawater in a fish storage system is presented comprising: a water environment containing ammonia and a water conditioner comprised of an amount of sodium formaldehyde bisulfite; an amount of cornstarch; an amount of dye; and an amount of alcohol. The amount of the components may be as follows: sodium formaldehyde bisulfite at about 10 g; cornstarch at about 1 g; dye, which may be blue pond dye, may be about 0.15 g; and alcohol may be about 1 mL. The system may also comprise an amount of refill water wherein the refill water is used to replace at least ⅔ of the saltwater in the fish storage system once per day.

In some embodiments, the system may further comprise an ammonia removal agent comprised of a freshwater or seawater modified chabazite compound and an amount of a phosphate buffer. The freshwater or seawater modified chabazite compound may be coated with a dye.

In an embodiment, a method of controlling an ammonia level in a water environment is presented comprising: adding an amount of a water conditioner to the water environment wherein the water conditioner comprises an amount of sodium formaldehyde bisulfite; an amount of cornstarch; an amount of dye; and an amount of alcohol. The amount of the components may be as follows: sodium formaldehyde bisulfite at about 10 g; cornstarch at about 1 g; dye, which may be blue pond dye, may be about 0.15 g; and alcohol may be about 1 mL.

The method may further comprise replacing at least ⅔ of water in the water environment with refill water daily The method may further comprise adding an ammonia removal agent comprised of a freshwater or seawater modified chabazite compound and an amount of a phosphate buffer.

The water conditioner may be added at least once per day wherein the total amount of water conditioner added to the water environment is ≤1 g/L. In some embodiments, the water environment is contained within a fish storage system. The water conditioner may first be added to the storage system within 3 hours of fish being contained within the storage system.

In am embodiment, a composition for removing ammonia is presented comprising: an amount of sodium formaldehyde bisulfite, an amount of corn starch, an amount of dye, and an amount of alcohol to form the ammonia removal agent. The amount of the components may be as follows: sodium formaldehyde bisulfite at about 10 g; cornstarch at about 1 g; dye, which may be blue pond dye, may be about 0.15 g; and alcohol may be about 1 mL. Amounts may change according to the size of the storage container, amount of fish contained therein, and frequency of addition to the storage container.

Other aspects of the invention will become apparent by consideration of the detailed description and accompanying drawings.

BRIEF DESCRIPTION OF THE DRAWINGS

For a fuller understanding of the invention, reference should be made to the following detailed description, taken in connection with the accompanying drawings, in which:

FIG. 8A-B is a series of images depicting ammonium removal efficiency in (A) freshwater and (B) seawater.

FIG. 9A-B is a series of images depicting ammonium adsorption equilibrium comparison between new chabazite and regenerated chabazite in (A) freshwater and (B) seawater.

DETAILED DESCRIPTION OF THE PREFERRED EMBODIMENT

Figure 1:
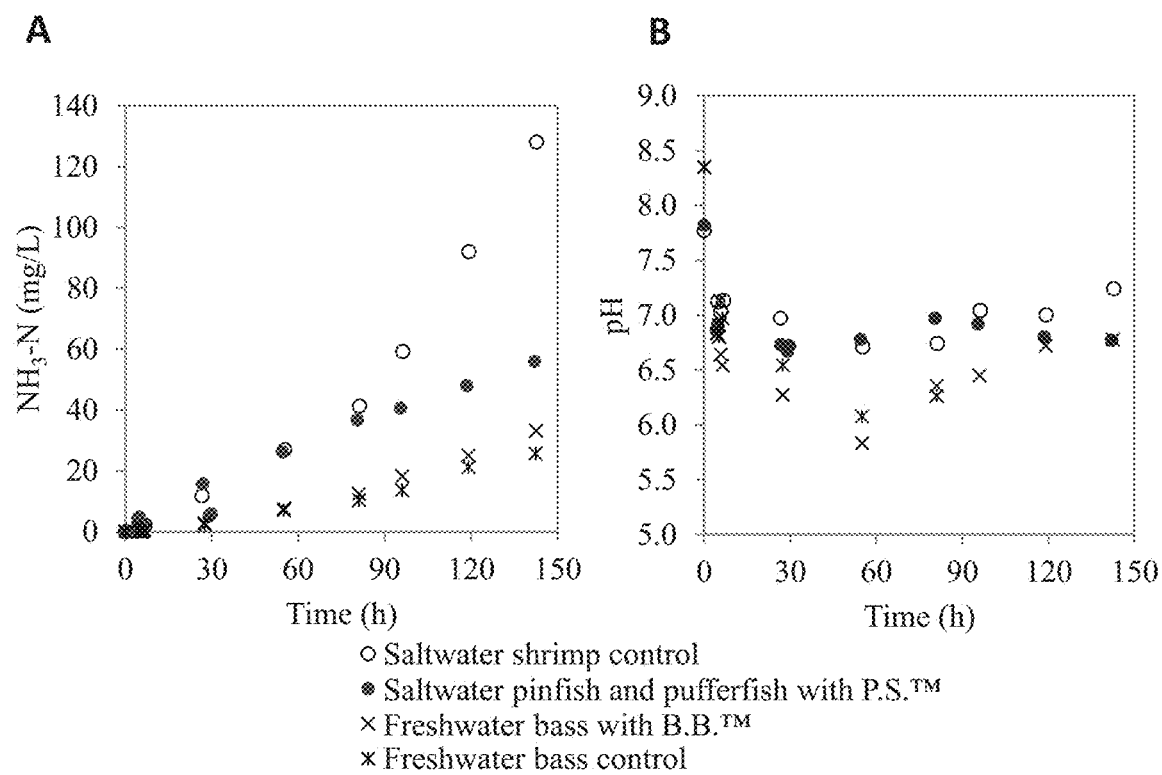
FIG. 1A-B are a series of images depicting (A) ammonia production as a function of time and (B) pH change as a function of time in seawater shrimp, seawater pinfish/pufferfish with Pogey-Croaker Saver™, freshwater bass with Better Baits™, and freshwater bass without Better Baits™.

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Abbreviations

IX—ion exchange
CN—chemical neutralization
NC—natural chabazite
FC—freshwater modified chabazite
DI—deionized water
SC—saltwater (seawater) modified chabazite
CC—commercial water conditioner
B.B.—Better Bait™ commercial water conditioner
P.S.—Pogey-Croaker Saver™ commercial water conditioner
LC—laboratory prepared chemical water conditioner Definitions Unless otherwise defined, all technical and scientific terms used herein have the same meaning as commonly understood by one of ordinary skill in the art to which this invention belongs. Although any methods and materials similar or equivalent to those described herein can be used in the practice or testing of the present invention, some potential and preferred methods and materials are described herein. All publications mentioned herein are incorporated herein by reference in their entirety to disclose and describe the methods and/or materials in connection with which the publications are cited. It is understood that the present disclosure supercedes any disclosure of an incorporated publication to the extent there is a contradiction.

All numerical designations, such as pH, temperature, time, concentration, and molecular weight, including ranges, are approximations which are varied up or down by increments of 1.0 or 0.1, as appropriate. It is to be understood, even if it is not always explicitly stated that all numerical designations are preceded by the term "about". It is also to be understood, even if it is not always explicitly stated, that the reagents described herein are merely exemplary and that equivalents of such are known in the art and can be substituted for the reagents explicitly stated herein.

Where a range of values is provided, it is understood that each intervening value, to the tenth of the unit of the lower limit, unless the context clearly dictates otherwise, between the upper and lower limits of that range is also specifically disclosed. Each smaller range between any stated value or intervening value in a stated range and any other stated or intervening value in that stated range is encompassed in the invention. The upper and lower limits of these smaller ranges may independently be excluded or included within the range. Each range where either, neither, or both limits are included in the smaller ranges are also encompassed by the invention, subject to any specifically excluded limit in the stated range. Where the stated range includes one or both of the limits, ranges excluding either or both of those excluded limits are also included in the invention.

The term "about" or "approximately" as used herein refers to being within an acceptable error range for the particular value as determined by one of ordinary skill in the art, which will depend in part on how the value is measured or determined. As used herein, the term "about" refers to ±10%.

As used herein, the term "comprising" is intended to mean that the products, compositions systems, and methods include the referenced components or steps, but not excluding others. "Consisting essentially of" when used to define products, compositions, systems and methods, shall mean excluding other components or steps of any essential significance. Thus, a composition consisting essentially of the recited components would not exclude trace contaminants and pharmaceutically acceptable carriers. "Consisting of" shall mean excluding more than trace elements of other components or steps.

Concentrations, amounts, solubilities, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include the individual values and sub-ranges within the indicated range. Thus, included in this numerical range are individual values such as 2, 3, and 4 and sub-ranges such as from 1-3, from 2-4 and from 3-5, etc. This same principle applies to ranges reciting only one numerical value. Furthermore, such an interpretation should apply regardless of the range or the characteristics being described.

As used in the specification and claims, the singular form "a", "an" and "the" include plural references unless the context clearly dictates otherwise. For example, the term "a nanoparticle" includes a plurality of nanoparticles, including mixtures thereof.

"Commercial water conditioner" as used herein refers to a composition used to neutralize or remove contaminants such as chlorine, chloramine, ammonia and/or heavy metals from the water in fish storage tanks. Examples of compositions that are commercially available include, but are not limited to, Pogey-Croaker Saver™ (P.S.™) for seawater and Better Baits™ (B.B.™) for freshwater.

"Laboratory prepared water conditioner (LC)" as used herein refers to a novel composition developed by the inventors that is designed to remove ammonia by chemical neutralization. LC consists of an amount of sodium formaldehyde bisulfite; an amount of cornstarch; an amount of dye, in some cases a blue dye; and an amount of alcohol. An exemplary ratio of each component is 10 g:1 g:0.15 g:1 mL, respectively. The total dose of LC may be ≤1.0 g/L/day. In some embodiments, aliphatic amine salts, hydrosulfite salts or sodium hydroxymethane sulfinic acid may be substituted for the sodium formaldehyde bisulfite in an appropriate amount and ratio to the other components.

"Seawater" or "saltwater" are used interchangeably herein to refer to water having a sodium chloride content of about 35 g/L or 35 ppt.

"Freshwater" as used herein refers to water that contains <0.5 ppt of dissolved salts.

"Wastewater" as used herein refers to water contained within a storage system in which live fish have been contained for an amount of time sufficient to generate an ammonia level in the water that is higher than the level that is present in the water prior to the fish being placed in the storage system.

"Freshwater modified chabazite (FC)" as used herein refers to chabazite that has been pretreated by soaking the chabazite in a synthetic freshwater solution having the ionic concentrations listed in Table 6. In some embodiments, the FC is soaked in the synthetic freshwater solution for about 24 hours.

"Seawater/saltwater or sodium chloride modified chabazite (SC)" as used herein refers to chabazite that has been pretreated by soaking the chabazite in sodium chloride or a synthetic seawater solution such as that having the ionic concentrations listed in Table 6. In some embodiments, the SC is soaked in the synthetic seawater solution for about 24 hours.

"Regenerated chabazite" as used herein refers to either FC or SC that was modified by pretreatment by soaking in either a synthetic freshwater solution for FC or a synthetic seawater solution or sodium chloride for SC, previously used for ammonia removal and has been regenerated in a batch system for reuse in removing ammonia from a storage system. Regenerated chabazite was shown to have between about 38-88% regeneration efficiency as compared to the originally modified FC or SC.

"AmmoSorb™" as used herein refers to the product developed by the inventors that is designed to remove ammonia by ion exchange and consists of a mesh bag packed with FC or SC along with a phosphate buffer. In some instances, the FC or SC is coated with a color such as a blue dye. Color coating of FC and SC may be achieved by suspending the FC or SC in an animal friendly color dye solution for a period of time such as 24 hours. The color allows the user to know when AmmoSorb™ has been added to the water.

"Refill water" as used herein refers to water, either saltwater or freshwater depending on the storage system, that that has not been contaminated with fish waste and is used to replace fish wastewater in the storage system.

"Ammonia removal agent" as used herein refers to a product used to remove ammonia from a body of water. While the ammonia removal agents used herein are described in terms of use in fish storage systems, the ammonia removal agents can be used in any body of water to decrease ammonia accumulation. Examples of ammonia removal agents include water conditioners such as LC as well as zeolites such as chabazite, particularly when packaged in the AmmoSorb™ product.

"Storage system" as used herein refers to any container used to house live fish for a period of time. Exemplary storage systems include, but are not limited to, buckets, tanks, pools, bowls, etc.

Example 1—Removal of Ammonia Using Water Conditioners

Commercial water conditioners (CC) were compared to a laboratory prepared water conditioner (LC) as well as to the zeolite chabazite in both freshwater and seawater to determine effectiveness of reducing ammonia levels in fish wastewater. The inventors found that LC has the highest ammonia removal efficiency in both freshwater and seawater over 24 hours.

Ammonia Accumulation Rate Determination

Experiments were carried out to determine accumulated ammonia concentration in fresh-caught fish or fish transportation systems with both fresh and seawater species. All live fish and shrimps were donated by Marine Metal Product, Inc. (MMP, Clearwater, FL). Ten freshwater bass collected from Belleview CC East Course Pond (Belleair, FL) were contained in approximately 52 L of freshwater. A second tank contained 3 marine pufferfish (Tetraodontidae) and 12 pinfish (Lagodon rhomboids) in approximately 55 L of seawater. A third tank included 15 marine shrimp (Penaeid) in 10 L of seawater. The specimens were kept in the lab for 7 days until all fish and shrimp perished. A commercial water conditioner was added to the tanks, as described below, within two to three hours after their initial storage time for each system and water samples were collected daily. A tablespoon (10.9 g) of B.B.™ was added to the large storage unit with 7 bass. Likewise, 21.4 g of P.S.™ was added to the pinfish/pufferfish unit. Concurrently, 3 bass were placed into a smaller unit (with 14 L of freshwater) and kept as a control (without water conditioner). Ammonia concentrations were measured using the salicylate method (HACH method 10031, Loveland, CO) and the accumulation rate (k) was calculated based on zero order kinetics:

$$C = C_0 + kt \quad (1)$$

where C (mg/L) is the ammonia concentration at time t (hour), and $C_0$ is the initial ammonia concentration (mg/L).

Ammonia accumulation as a function of time for the four units is shown in FIG. 1. Ammonia accumulated much faster in the unit containing the shrimp. The pH of the water had an obvious drop when the fish were added to the water. The values decreased from 8.35 to 6.83 in the unit containing bass and from 7.77 to 6.86 in the unit containing pinfish/pufferfish. No significant differences were found when CC was added (p-value=0.1 in freshwater, p-value=0.6 in seawater). Both fish and shrimp started to die after 80 hours, which coincided with $NH_3$—N concentrations higher than 10.3 mg/L in the bass control group; 12.4 mg/L in the bass with B.B.™; 36.7 mg/L in the pinfish/pufferfish unit, and as high as 41.2 mg/L in the shrimp unit. It was also observed that the pH in all four units started to increase at this point. These findings confirm that non-ionized ammonia production will increase with small increases in pH. This also verifies that the mechanism for the two water conditioners used in these experiments is not chemical or physical removal of non-ionized ammonia.

TABLE 1

Ammonia production rate constant for different groups

| Water type | System | k (mg NH₃-N/specimen/h) | R² |
|---|---|---|---|
| Freshwater | B.B. ™ | 0.17 ± 0.02 | 0.97 |
| | Control | 0.21 ± 0.03 | 0.97 |
| Seawater | P.S. ™ | 0.40 ± 0.05 | 0.96 |
| | Control | 0.81 ± 0.17 | 0.94 |

Ammonia accumulation rates shown in Table 1 were calculated based on a zero-order kinetic model in which the accumulation rate (mg $NH_3$—N/fish/h) is the same as the slope. Since fish started to perish after 80 hours, the ammonia accumulation by living fish was calculated based on the first 80 hours. The results show that the k of freshwater bass with B.B.™ added (0.17±0.02 mg $NH_3$—N/fish/h) is about two times higher than the k calculated from bass in the control group (0.21±0.03 mg $NH_3$—N/fish/h). However, the results were not significantly different (p-value=0.82), therefore it was concluded that the water conditioner has no effect on the ammonia removal. The value of k in the control was similar to the results in the literature, where the C. tarichi can produce 0.94±0.36 mg $NH_3$—N/fish/h (Danulat and Kempe, 1992). In seawater, the pinfish/pufferfish group excreted about 0.40±0.05 mg $NH_3$/fish/h when P.S.™ added, while the shrimp produced about 0.81±0.17 mg $NH_3$/fish/h. From other literature, the average ammonia excretion rate of seawater blue crab is 0.57 mg $NH_3$—N/fish/h (Kormanik and Cameron, 1981), which indicates that the experimental data is within a reasonable range.

In-Vitro Comparison of Ammonia Removal

In preliminary in-vitro experiments carried out in the lab, no ammonia removal was observed when only phosphate buffer was added. In addition, if AmmoSorb™ was only added once at the beginning of an experiment, there was no ammonia removal after 24 hours (data not shown). This can be explained by observing the data obtained from the ammonium adsorption study using chabazite. (Aponte-Morales, V. E., 2015). The majority of ammonium adsorption using chabazite only takes places during the first hour. After that, ammonium adsorption is slow.

The in-vitro study was performed in two fish aeration systems for each ammonia removal agent. Each system included a 13 L container and an air pump. Each system was filled with 10 L of synthetic water. An $NH_4Cl$ solution was pumped into each system at a specified rate based on the ammonia accumulation rate experiment described above. One of the ammonia removal agents (AmmoSorb™, CC or LC) was added into one aeration system. The other aeration system was set up as a control group. Samples were taken every hour for 24 hours. Ammonia concentrations of water samples were tested by high performance ammonia ion selective electrode (Fisher Scientific, Pittsburgh, PA). The ammonia removal efficiency (%) is calculated based on the final ammonia concentration in the control group ($C_{control}$) and the experiment group ($C_{experiment}$) by Equation 1:

$$\frac{C_{control} - C_{experiment}}{C_{control}} \times 100 \quad (2)$$

To enhance ammonia removal performance, each of the ammonia removal agents (AmmoSorb™, CC and LC) was added to the respective containers every three hours. The result of ammonia removal efficiency at the end of 24 hours under in-vitro conditions is shown in Table 2.

TABLE 2

Ammonia removal efficiency comparison among AmmoSorb ™, Commercial water conditioner (CC), and Laboratory prepared chemical conditioner (LC)

| | Ammonia removal efficiency (%) | |
|---|---|---|
| | Freshwater | Seawater |
| AmmoSorb ™ | 39.25 ± 1.27 | 24.56 ± 1.85 |
| CC | 0.00 | 15.29 ± 7.12 |
| LC | 17.44 ± 0.55 | 28.64 ± 1.63 |

As shown in Table 2, in freshwater conditions, the average k in control group is 0.38±0.07 mg/L/h, while the k of AmmoSorb™ amended tanks is as low as 0.25±0.02 mg/L/h (p-value 0.0025). Therefore, at the end of 24 hours, AmmoSorb™ had the highest ammonia removal efficiency compared with CC and LC.

In seawater conditions, due to the competing ions in the seawater, the ammonia removal efficiency of AmmoSorb™ was lower than for freshwater (24.56±1.85%). In seawater, LC had the highest removal efficiency.

These results reveal that both IX and CN methods are capable of removing ammonia in simulated fish conditions. Furthermore, adding the ammonia removal agent more frequently can potentially enhance the ammonia removal efficiency.

In-Vivo Comparison of Ammonia Removal

The in-vivo study was approved by the Institutional Animal Care and Use Committee (IACUC). Tilapia and pinfish were selected as representative fish species that live in a freshwater and a seawater environment, respectively. Tilapia were collected at a fresh water lake in Bellaire, Florida, U.S.A. Pinfish were collected from a mangrove coastal seawater site located at the same location as the tilapia. Within 1 hour of catch, live fish were transported to the laboratory and raised in the dark without feeding, while constant oxygen is pumped using air stones. The tilapia (7.97±1.15 lb; N=15) were raised in five coolers with three tilapias in each cooler. Each cooler contained 50 L of freshwater. The pinfish (0.07±0.02 lb; N=200) were maintained in five buckets with approximately 30 pinfish in each bucket. Each bucket was filled with 27 L of seawater. The water temperature ranged from 22° C. to 23° C. The pH of freshwater and seawater were 7.19±0.19 and 7.48±0.02, respectively. Each of the five coolers or buckets contained different study groups: (1) control group; (2) CC added; (3) LC added; (4) AmmoSorb™ (FC or SC) added; and (5) combined AmmoSorb™ (FC or SC) and LC added. The water was sampled every hour for 24 hours. According to the requirement of Institutional Animal Care and Use Committee (IACUC), fish that show end point signs (i.e., inactive, not eating, surface breathing) were euthanized.

Figure 2:
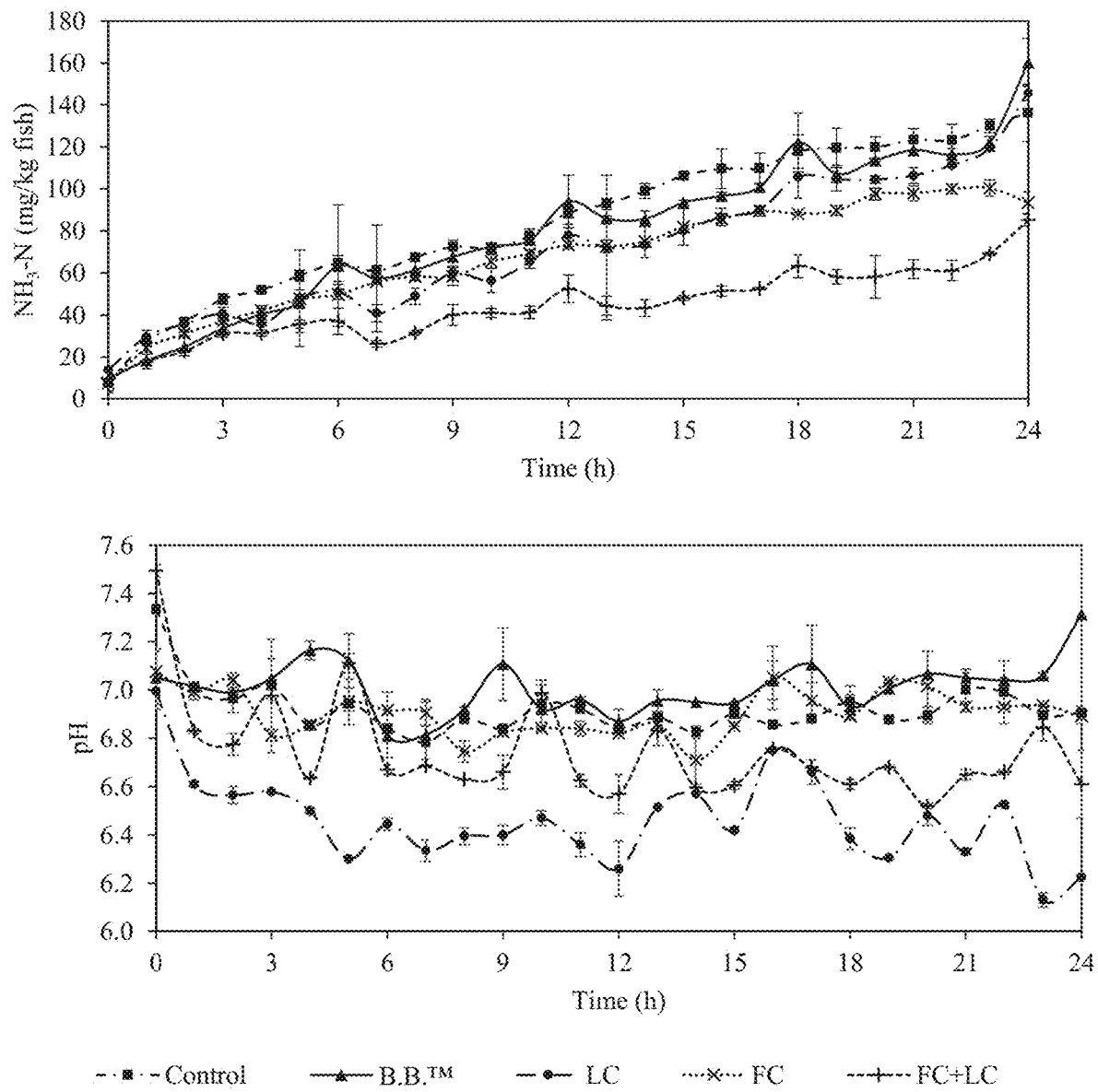
FIG. 2 is an image depicting ammonia excretion (top) and pH trend (bottom) of the freshwater specimen as a function of time.

Results from the in-vivo experiment for the freshwater specimen is shown in FIG. 2. FIG. 2(a) shows the concentration of $NH_3$—N per fish over time (h). FIG. 2(b) shows the pH change over time (h). No fish died during the experiments, however, significant differences were observed among each group. In the control group, the ammonia accumulation rate was 4.68±0.38 mg/kg fish/h ($R^2$=0.97). While in the CC group, the ammonia accumulation rate was slightly higher than the control (k=4.98±0.49 mg/kg fish/h, $R^2$=0.95, p-value 0.0041). This result was consistent with the in-vitro experiment result, where the commercial water conditioner had no effect on ammonia removal. The k in the LC group was 4.37±0.40 mg/kg fish/h ($R^2$=0.95) and in the AmmoSorb™ group was 3.42±0.36 mg/kg fish/h ($R^2$=0.94). These results also confirmed the data in the in-vitro experiment. IX may have better ammonia control capacity than CN (p-value=0.09). In water, the ammonia is present in both the free ammonia form ($NH_3$) and ammonium form ($NH_4^+$). Both are maintained in equilibrium conditions in water according to the following equation:

$$NH_3 + H_2O \leftrightarrow NH_4^+ + OH^- \tag{3}$$

Figure 3:
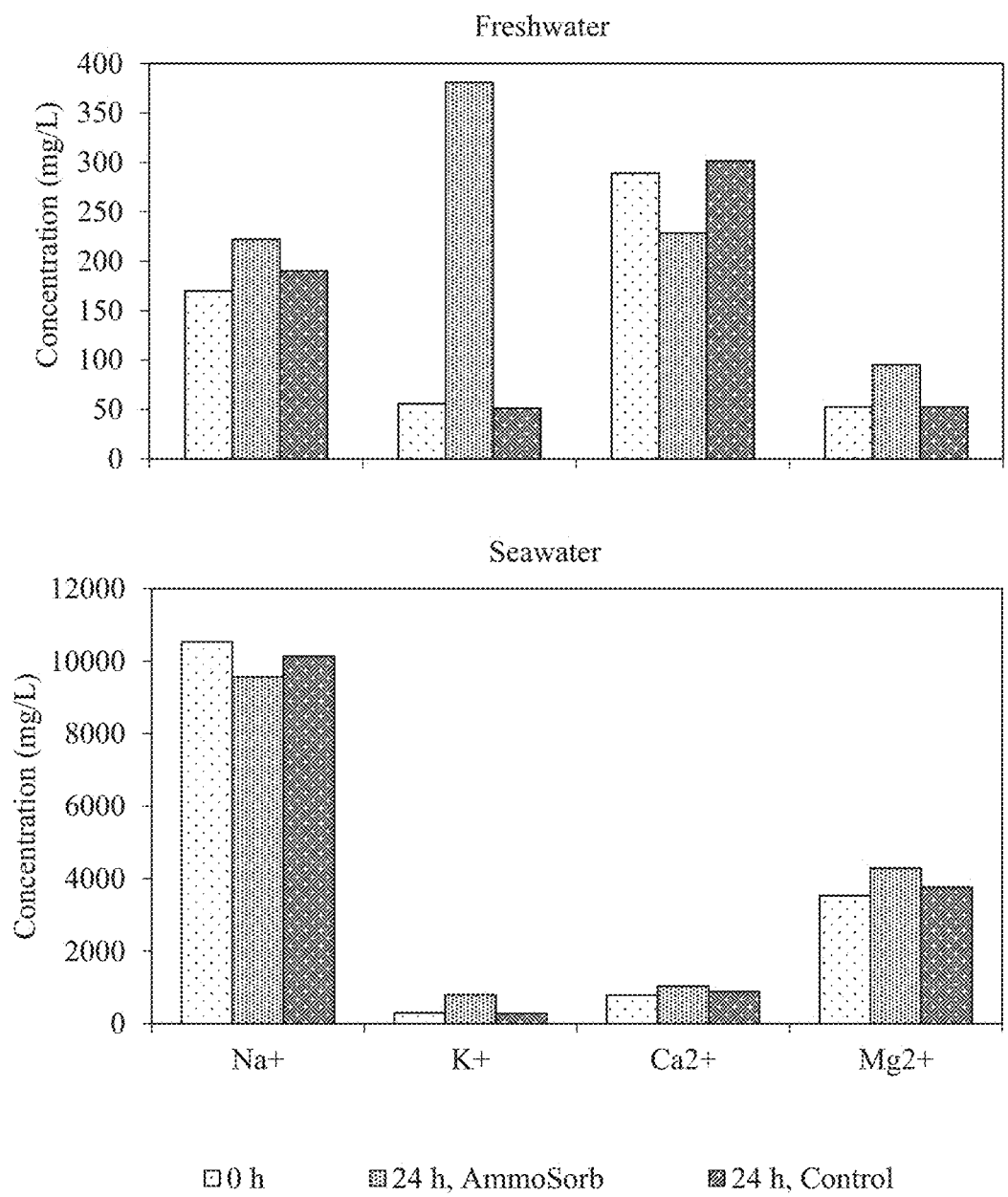
FIG. 3 is an image depicting exchangeable ion comparison before and after AmmoSorb™ intervention. Freshwater (Top); Seawater (Bottom).

Ammonia removal by the IX process occurs when $NH_4^+$ is exchanged by other changeable ions ($Na^+$, $Mg^{2+}$, and $Ca^{2+}$) in the zeolite which shifts the equilibrium from left to right in Eq. 3. FIG. 3 shows the exchangeable ion concentration before and after the in-vivo experiment. The increase in $Na^+$ and $Mg^{2+}$ is attributed to the IX process; when the $NH_4^+$ is taken up by the AmmoSorb™, $Na^+$ and $Mg^{2+}$ are released. The order of ion selectivity for chabazite is $K^+ > NH_4^+ > Na^+ > Ca^{2+} > Mg^{2+}$. (Aponte-Morales, V. 2014; Hedstrom, A., 2004). The sharp increase in $K^+$ was caused by the addition of phosphate buffer. The decrease in $Ca^{2+}$ was most likely due to formation of calcium phosphate precipitates.

The mechanism of CN with the help of SFB can be simply written as (Kuhns, 1987):

$$HOCH_2SO_3^- + NH_3 \rightarrow H_2NCH_2SO_3^- + H_2O \tag{4}$$

Because the average pH of bulk exposure water in all five groups is 6.81±0.19, the major fraction of ammonia is $NH_4^+$ (USEPA, 1999). Therefore, the CN reaction (Eq. 4) is limited, however, the IX process (Eq. 3) can proceed. The combination of AmmoSorb™ and LC had the lowest ammonia accumulation rate (k=2.23±0.31 mg/kg fish/h, $R^2$=0.90). In terms of the pH, the lowest water pH was found in the LC group (pH=6.46), but this pH is still fish friendly (Stevens, 2009).

Figure 4:
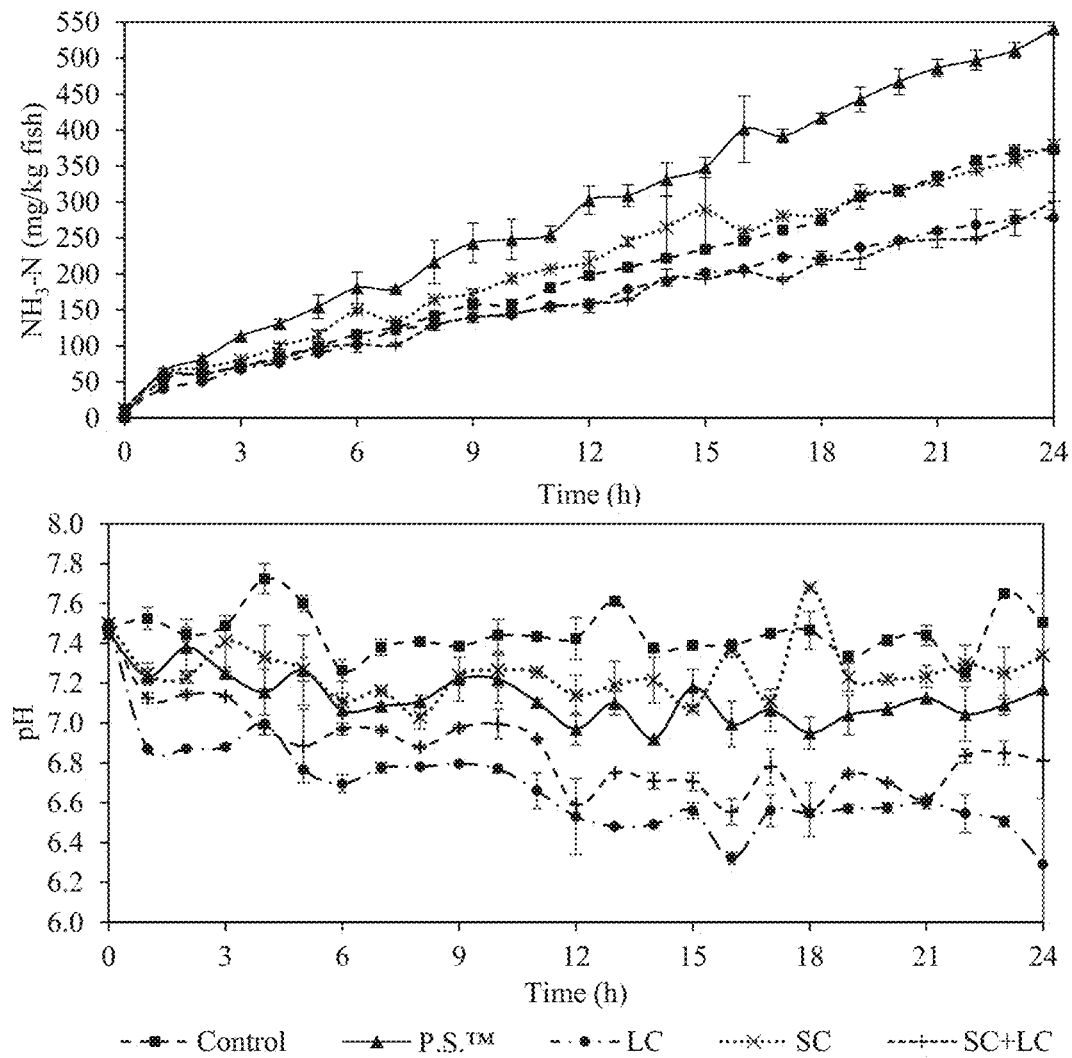
FIG. 4 is an image depicting ammonia excretion (top) and pH trend (bottom) of the seawater specimen as a function of time.

The in-vivo experiment results for the seawater specimen are shown in FIG. 4. The results indicate that the k in CC group (k=9.59±0.32 mg/kg fish/h, $R^2$=0.99) is much higher than the control group (k=6.68±0.24 mg/kg fish/h, $R^2$=0.99, p-value 7.90E-10). The reason for this phenomenon is unknown, but one can combine the results from the freshwater experiment to conclude that the commercial water conditioner (CC) does not remove ammonia from the water. In seawater, the AmmoSorb™ (k=6.38±0.37 mg/kg fish/h, $R^2$=0.98) is less effective than the LC (k=4.89±0.20 mg/kg fish/h, $R^2$=0.99, p-value 1.5E-09), which is consistent with the results of the in-vitro experiment. The high $Na^+$ ion concentration reduces the effectiveness of the IX process. (Miladinovic et al., 2004). The k in the combined AmmoSorb™ and LC group is the lowest (k=4.61±0.26 mg/kg fish/h, $R^2$=0.98), which is consistent with the freshwater result. The average pH in the LC group was 6.68, which is also a safe pH range for fish health.

FIG. 3 (bottom) shows the exchangeable ion concentrations in seawater before and after AmmoSorb™ addition. The decreasing of $Na^+$ is likely due to the IX process since $Na^+$ is the dominant concentration in the liquid phase (Colella, 1996). The increase of $K^+$ was caused by the addition of phosphate buffer. By considering the ion selectivity of $K^+$ and $Na^+$, it is recommended that sodium phosphate buffer be used instead of potassium phosphate buffer in this process. The slightly increasing $Ca^{2+}$ and $Mg^{2+}$ may be explained due to the poor IX process by AmmoSorb™.

Toxicity Assessment

*Daphnia magna* neonates (age<24 h) were used in the toxicity test. The tests were conducted at 23° C. Ten neonates were placed in a 100 mL transparent plastic beaker with triplicates for each group. The number of dead neonates was recorded at 24 and 48 hours after the initiation of the test. The test water included spring water (control), CC added water (B.B.™ for freshwater and P.S.™ for seawater), LC added water, or AmmoSorb™ added water. The concentration of each conditioner was the daily maximum dose designed to be added to the water (Table 3). The $LC_{50}$ of LC and CC was also tested. The $LC_{50}$ refers to the concentration of a substance that is lethal to 50% of the animals in the toxicity test (Boyd, 2005). The exposure periods were 24 and 48 hours. Five concentrations were tested from 0 to 2 g/L.

TABLE 3

The daily maximum dose of ammonia removal substance

| Substances | Daily maximum dose (g/L/day) |
|---|---|
| B.B. ™ | 1.0 |
| P.S. ™ | 1.0 |
| LC | 1.0 |
| AmmoSorb ™ | 4.6 |
| AmmoSorb ™ | 8.8 |

Figure 5:
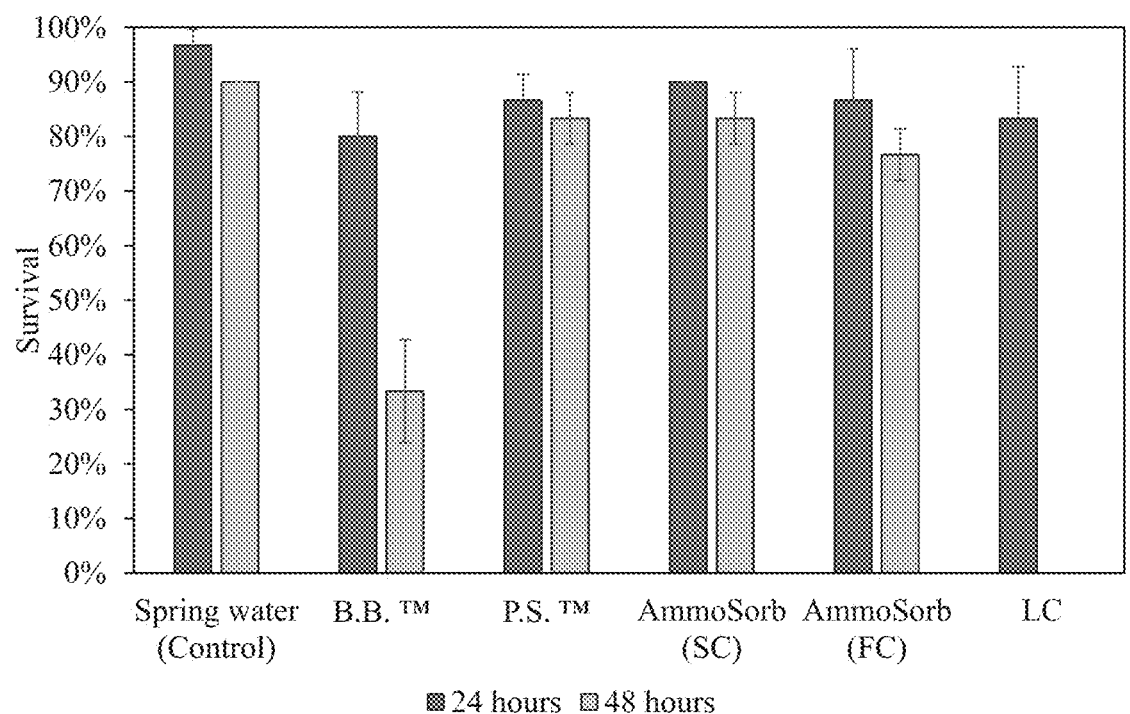
FIG. 5 is an image depicting toxicity comparison among each ammonia removal substance (Spring water works as control).

The results of the toxicity test are shown in FIG. 5. *Daphnia magna* is the regulated species by USEPA Toxic Substance Control Act (FSCA) for toxicity tests (Hayes, 2007). According to EPA guidelines, the survival percentage of *Daphnia magna* in the control group should be equal to or higher than 90% at the end of testing time (USEPA, 2002). This criterion was fulfilled in this experiment. After 24 hours, B.B.™ had the lowest survival rate of 80±5%. After 48 hours, the survival rate decreased to 33±9%. The 48-hour toxicity of the LC group was found to be the highest of all test groups. The AmmoSorb™ and P.S.™ can be considered nontoxic to *Daphnia magna* neonates.

The $LC_{50}$ results are tabulated in Table 4. After 24 hours, the lethal concentration of LC for *Daphnia magna* neonates is 1.32 g/L, which is higher than the daily maximum dose (1 g/L). Thus, if the daily dose of LC that is used to remove ammonia does not exceed the daily maximum dose (1.0 g/L), the LC is relatively safe to *Daphnia magna* neonates. In addition, replacing two thirds of the fish wastewater in the storage system with refill water daily is also recommended to minimize the effect of toxic ammonia.

TABLE 4

$LC_{50}$ of commercial water conditioners (B.B. ™ and P.S. ™) and laboratory prepared chemical conditioner (LC)

| | 24 h | 48 h |
|---|---|---|
| B.B. ™ | 2.64 g/L | 0.52 g/L |
| P.S. ™ | 3.57 g/L | 1.98 g/L |
| LC | 1.32 g/L | 0.73 g/L |

Cost Analysis

Table 5 shows the daily cost comparison between the AmmoSorb™, LC, and CC. The cost of LC was calculated based on the maximum recommendation dosage (1 g/L). The cost of AmmoSorb™ and CC was calculated based on the dose used in the in-vivo experiment (Table 3). The source of each component price comes from the company quote or commercial vendors. The daily cost of LC was the lowest.

TABLE 5

Daily cost comparison between the AmmoSorb ™, the laboratory prepared chemical conditioner (LC), and the commercial water conditioner (CC)

| | AmmoSorb ™($/da | LC($/day) | CC($/day) |
|---|---|---|---|
| Freshwater | 3.53 | 0.90 | 1.23 |
| Seawater | 3.53 | 0.34 | 2.09 |

Materials and Methods

Ammonia Removal Materials

Ion Exchanger

Chabazite was purchased from St. Cloud Mining Inc. (Winston, NM). The grain size range was 1-2 mm. All natural chabazite (NC) grains were washed by deionized (DI) water to remove extremely small particles and then dried in an oven set to 110° C. Washed chabazite were stored in a sealed plastic bottle at room temperature. Freshwater modified chabazite (FC) was made from NC soaked in synthetic freshwater (Table 6) (Villavicencio et al., 2011) where the suspension was shaken for 24 hours. The FC particles were then washed with DI water and dried at 110° C.

Seawater modified chabazite (SC) was made from NC soaked in 117 g/L NaCl (2M) where the suspension was shaken using a shaking table for 24 hours. The SC particles were then washed with DI water and dried at 110° C. Embodiments in which synthetic seawater was used, the synthetic seawater was prepared according to Table 6. (Orr, 2008).

AmmoSorb™ is used to describe the product developed by the inventors that is designed to remove ammonia by IX. The AmmoSorb™ product consists of a mesh bag packed with color coated FC or SC with a phosphate buffer (Innophos™). Color coating of FC and SC was carried out by suspending it in an animal friendly blue dye solution (Outdoor Water Solution™) for 24 hours. The blue color allows the user to know when AmmoSorb™ has been added to the water.

Chemical Neutralizer

Two commercial water conditioners (CC) were tested—Better Bait™ (used in freshwater, abbr. B.B.™) and Pogey-Croaker Saver™ (used in seawater, abbr. P.S.™). The amount of water conditioner added was calculated based on the directions on the corresponding container. A laboratory prepared chemical conditioner (LC) was also tested which was composed of sodium formaldehyde bisulfite (Kuhns, 1987); blue dye (Outdoor Water Solution™); and cornstarch suspended in alcohol. Blue dye functions as a color indicator, while cornstarch enhances the dispersion of sodium formaldehyde bisulfite as well as extend the long-term stabilization of LC. The total dose of LC was 1.0 g/L/day.

Other Materials

In the in-vitro experiment, the fish wastewater was prepared by continuously adding $NH_4Cl$ into freshwater or seawater. The freshwater was obtained from Simmons Park, located at the University of South Florida, FL (average pH=8.49, alkalinity=62.09 mg/L). The seawater was prepared based on the instructions of Instant Ocean™. The composition of synthetic freshwater and seawater are listed in Table 6.

TABLE 6

Synthetic Water Constituents

| Ion | Synthetic freshwater (g/L) | Synthetic seawater (g/L) |
|---|---|---|
| Sodium ($Na^+$) | 0.075 | 10.780 |
| Potassium ($K^+$) | 0.00312 | 0.42 |
| Magnesium ($Mg^{2+}$) | 0.024 | 1.32 |
| Chloride ($Cl^-$) | 0.193 | 19.290 |
| Calcium ($Ca^{2+}$) | 0.043 | 0.400 |
| Bromide ($Br^-$) | — | 0.056 |
| Bicarbonate ($HCO_3^-$) | 0.0048 | 0.200 |

TABLE 6-continued

Synthetic Water Constituents

| Ion | Synthetic freshwater (g/L) | Synthetic seawater (g/L) |
|---|---|---|
| Sulfate ($SO_4^{2-}$) | 0.096 | 2.66 |
| Alkalinity | 0.310 | 0.241 |

Analytical Methods

Ammonia concentrations were measured using the salicylate method (HACH method 10023, Loveland, CO) and a high-performance ammonia ion selective electrode (Fisher Scientific, Pittsburgh, PA). pH values were measured by a pH meter (Denver Instrument Model 250, Bohemia, NY). Cation concentrations ($Na^+$, $K^+$, $Mg^{2+}$, and $Ca^{2+}$) were detected by Ion Chromatography (IC, Metrohn 850, Switzerland).

Statistical Analysis

All samples in the in-vitro and in-vivo experiments were taken in triplicate. The results of concentration and pH were present as the mean with max/min values. The data analysis of linear regression was performed in Microsoft Excel 2013, with results presented as slope with uncertainty. A student t-test was used to determine if the results from the ammonia removal efficiency studies were statistically significant at an alpha value of 0.05.

Conclusion

The inventors compared the ammonia removal efficacy of ion exchange and chemical neutralization as a function of the ammonia removal efficiency, toxicity, and daily cost. In terms of the ion exchange method, although the in-vitro trials show noticeable results of ammonia removal in both freshwater and seawater, the in-vivo trials revealed that chabazite does not work well in seawater. The commercial water conditioners (CC) were unable to control ammonia levels in either freshwater or seawater. The inventors found that for seawater, the laboratory prepared chemical conditioner (LC) had the highest ammonia removal efficiency. A combination of both LC and AmmoSorb™ functioned to have significant ammonia removal efficiency in both freshwater and seawater.

Example 2—Removal of Ammonia Using Modified Chabazite

The use of the natural zeolite material, chabazite, as an ion exchange medium has the potential to decrease the toxicity of the environment for transportation of fresh caught fish. The inventors investigated kinetic and isotherm models that describe the ammonia removal performance of modified chabazite in both freshwater and seawater applications. Chabazite was subsequently regenerated in a batch system and the same kinetic and isotherm studies were performed on the regenerated materials. Chabazite particles were modified by pretreatment in freshwater and sodium chloride solution to apply to freshwater and seawater, respectively. The modified chabazite was characterized by powder X-ray diffraction (XRD) and chemical composition changes. Ammonium exchange capacities of modified chabazite were 11.1 mg/g and 7.70 mg/g for freshwater and seawater, respectively. Ammonium adsorption fit a pseudo-second-order kinetic reaction model under both freshwater and seawater conditions. Non-linear regression of a Sips isotherm model resulted in the best fit for ammonia removal in both freshwater and seawater. The regenerated chabazite had 38-88% regeneration efficiency compared with the original material.

Characterization of Chabazite

Analysis of the chemical composition of chabazite showed that the chabazite used in this study was sodium-dominated (Table 7). Table 8 lists the textural and physicochemical properties of the chabazite obtained from the manufacturer. The reported ion exchange capacity can be as high as 2.5 mg/g.

TABLE 7

Chemical composition of chabazite based on SEM-EDS analysis

| Chemical | Percentage (%) |
|---|---|
| Si | 31.65 ± 1.33 |
| Al | 9.04 ± 0.35 |
| Ca | 0.83 ± 0.05 |
| Mg | 0.54 ± 0.05 |
| Na | 7.19 ± 0.61 |
| K | 1.02 ± 0.13 |

TABLE 8

Textural and physicochemical properties of chabazite

| Property | Value |
|---|---|
| Surface area | 460 m²/g |
| Ion exchange capacity | 2.5 mg/g |
| Density | 1.73 g/cm³ |
| Pore volume | 0.468 cm³/g |

Figure 6:
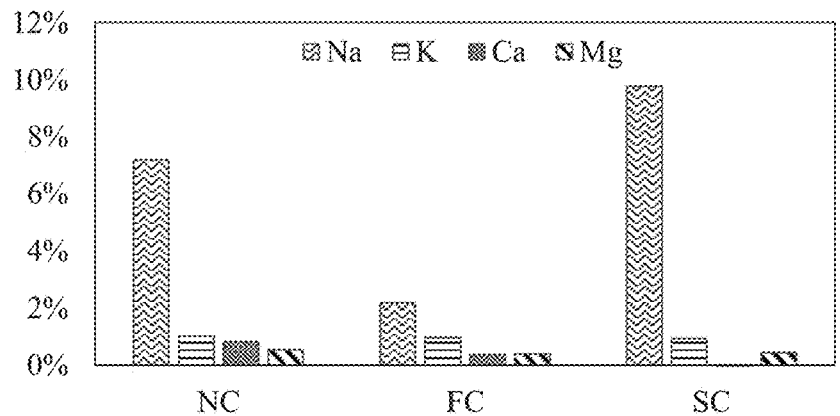
FIG. 6 is an image depicting the chemical composition of exchangeable cations changes before and after modification of natural chabazite (NC), freshwater modified chabazite (FC) and seawater modified chabazite (SC).

The chemical compositions of cations before and after modification is shown in FIG. 6. In natural zeolite, $Na^+$, $K^+$, $Ca^{2+}$, and $Mg^{2+}$ are exchangeable cations and these cations balance the negative charges by isomorphic substitution of the Al atoms in the framework (Leyva-Ramos, Monsivais-Rocha, et al., 2010). Natural chabazite (NC) has the highest weight percentage of $Na^+$ in the framework compared to other cations. After being modified with synthetic freshwater (FC), the concentration of $Na^+$ decreased from 7.19% to 1.9%. Meanwhile, $Ca^{2+}$ also decreased from 0.8% to 0.3%, $Mg^{2+}$ had a slight reduction (~0.16%), and there were almost no changes in $K^+$ between NC and FC (<0.1%). This phenomenon can be explained by the ion exchange reaction. Ion exchange commonly occurs between liquid and solid phases when there is ion sharing. The process is determined by the ion selectivity and the ion concentrations in both phases (Colella, 1996). The ion selectivity is a function of both the hydrated radius of the ions in solution and the magnitude of the charge (Boyd, Schubert, et al., 1947; Colella, 1996). Since the external ion strength in freshwater is low, the ion exchange process is mainly determined by the cationic affinity. The cationic affinity sequence for chabazite is commonly written as: $K^+>Na^+>NH_4^+>Ca^{2+}>Mg^{2+}$ (Breck, 1973; Barrer, Davies, et al., 1969; Colella, 1996). Therefore, in FC, Nat, $Ca^{2+}$ and $Mg^{2+}$ ions are exchanged during the modification process. This change probably created more residual negative charges on the chabazite framework. The effect of treatment with NaCl solution also showed the same trend as treatment with synthetic freshwater; the only difference was the increase in $Na^+$ in the SC. As the $Na^+$ in the liquid phase is much higher than any other ions in the solid phase, $Na^+$ is easily exchanged. $Ca^{2+}$ decreased to almost zero in this case. This result is reasonable because $Na^+$ and $Ca^{2+}$ have a lower cationic affinity with the chabazite framework.

Figure 7:
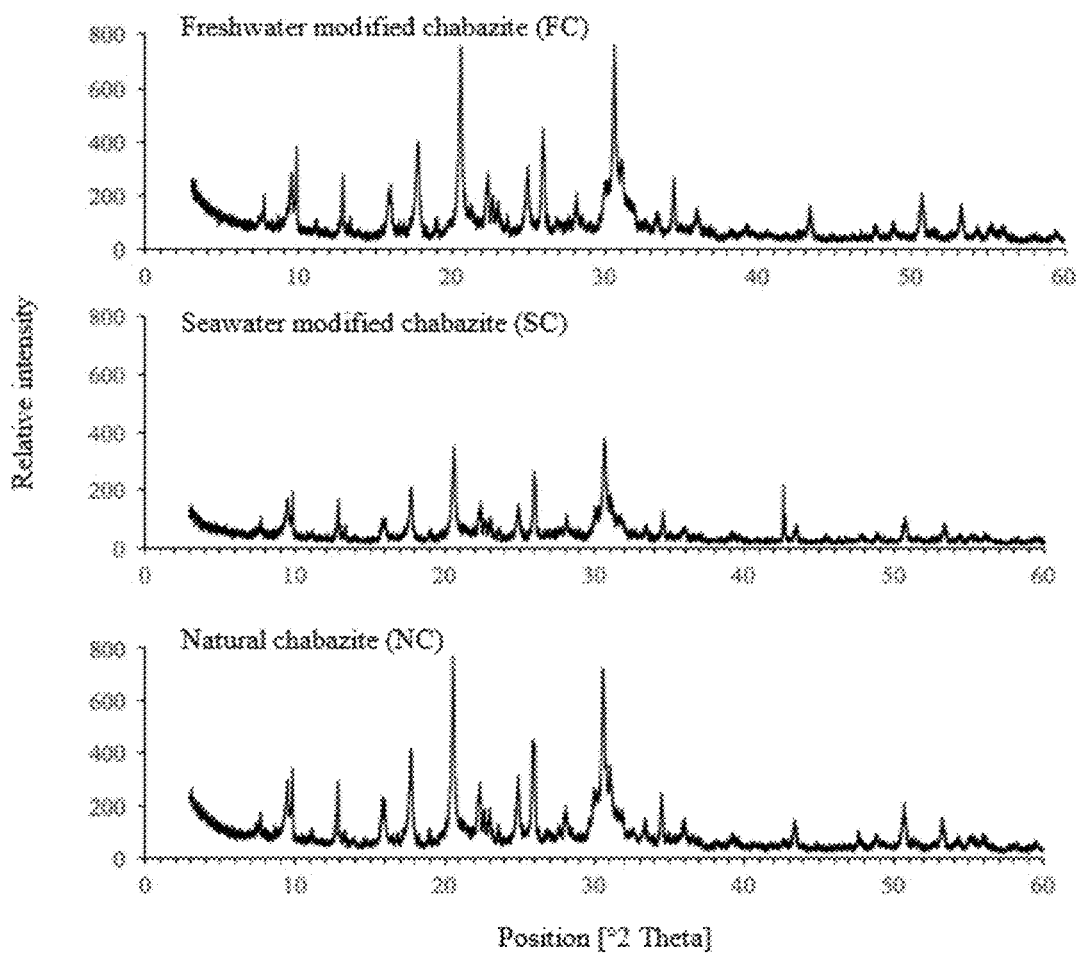
FIG. 7 is a series of images depicting XRD pattern comparison between freshwater modified chabazite (FC) (top), sodium chloride (seawater) modified chabazite (SC) (middle) and natural chabazite (NC) (bottom).

XRD patterns of chabazite before and after modification are shown in FIG. 7. The chabazite used in this study has the same characteristic peaks as described previously (Treacy, 1986), and those peaks are consistent among NC, FC, and SC. Although SC has a relatively high intensity at the 2θ value of 42.6, this peak still matched with the peak lists of chabazite (Treacy, 1986).

Ammonium Adsorption Kinetics

A pseudo-second-order relation had best correlation with the experimental kinetic data in both freshwater and seawater. This finding is the same as most published literature (Yusof, Keat, et al., 2010; Karadag, Koc, et al., 2007). Table 9 lists the results of pseudo-second-order kinetics constants and coefficient data for both freshwater and seawater. The value of Δq is very small, which confirms that the pseudo-second-order kinetic model is the best fit to the experimental data.

From both freshwater and seawater data, we see some similar trends. The adsorption capacity ($q_{e,exp}$) increased with increasing initial ammonium concentration. The high initial concentration of ammonium provided a powerful driving force to overcome mass transfer resistance from solution to the adsorbent; therefore, adsorption of a higher number of ammonium molecules onto a given amount of chabazite will increase the adsorption capacity (Tsai, Hsien, et al., 2009; Moussavi, Talebi, et al., 2011). In comparison with freshwater, $q_{e,exp}$ in seawater was about half of $q_{e,exp}$ in freshwater. The cations in seawater also interacted with the zeolite, decreasing the ability of ammonium ions to bind freely (Burgess, Perron, et al., 2004). Another important finding from Table 9 is that the rate constant, ($k_2$), decreased, while the initial adsorption rate (h) increased with increasing initial ammonium concentration. This also shows that the mass transfer rate of ammonium ions improved with increasing initial ammonium concentration (Moussavi, Talebi, et al., 2011).

The third finding can be combined with the equilibrium removal of ammonium (FIG. 8). The kinetic studies were conducted for 270 mins, but only 30 mins were needed for an equilibrium concentration to be achieved. The same phenomena can be found in other literature (Burgess, Perron, et al., 2004; Huang, Xiao, et al., 2010; Alshameri, Ibrahim, et al., 2014; Karadag, Koc, et al., 2006; Du, Liu, et al., 2005). The most probable explanation is that ammonium diffused onto the external surface of the chabazite, which was followed by pore diffusion into the intraparticle surfaces to attain equilibrium. The key driving force in this case is the difference in the adsorbed concentration of ammonium at chabazite surface ($q_e$) and the solution $q_t$ (Ho, Chiang, et al., 2005; Alshameri, Ibrahim, et al., 2014). The ion exchange capacity is proportional to the number of active ion exchange sites at chabazite (Wen, Ho, et al., 2006; Alshameri, Ibrahim, et al., 2014). The pseudo-second-order kinetic model involves three steps of ion exchange. In the first step ammonium ions diffuse from the liquid phase to the liquid-solid interface (film diffusion), and then the ammonium ions move from the liquid-solid interface to the solid phase of the adsorbent (pore diffusion). Finally, the ammonium ions diffuse into the interparticle pores (Liao, Ismael, et al., 2012; Wang, Shu, et al., 2011; Alshameri, Ibrahim, et al., 2014).

A plot of the intraparticle diffusion model confirmed that the sorption processes includes both film diffusion and pore diffusion (Moussavi, Talebi, et al., 2011; Vadivelan and Vasanth Kumar, 2005). The contribution of each step can be further studied by looking at the value of the particle diffusion coefficient ($D_p$) and film diffusion coefficient ($D_f$) (Table 10). The value of $D_p$ for freshwater is higher than the value of $D_f$, but opposite relations are observed in the seawater. This shows that in freshwater, film diffusion is the dominant mechanism in the adsorption rate. In seawater, pore diffusion dominated the rate of sorption. For the sorption process, film diffusion controls when the system has poor mixing, and dilute adsorbate concentration. In contrast, pore diffusion controls the sorption process when the adsorbate has low affinity for the adsorbent (Vadivelan and Vasanth Kumar, 2005). $Na^+$ has a relatively lower affinity than $K^+$, therefore it is reasonable to have greater pore diffusion in seawater.

TABLE 9

Pseudo-second-order kinetic parameters for ammonium removal in both freshwater and seawater

| | $NH_4^+$-N | Pseudo-second-order | | | | | |
|---|---|---|---|---|---|---|---|
| Water type | concentration (mg/L) | $k_2$ (g/mg · min) | h (mg/g · min) | $q_{e,exp}$ (mg/g) | $q_{e,cal}$ (mg/g) | $R^2$ | Δq (%) |
| Freshwater | 10 | 12.59 | 1.14 | 0.30 | 0.30 | 1.00 | 0.17 |
| | 30 | 0.43 | 0.36 | 0.92 | 0.91 | 1.00 | 0.43 |
| | 50 | 0.39 | 0.88 | 1.50 | 1.49 | 1.00 | 0.24 |
| | 100 | 0.16 | 1.25 | 2.77 | 2.74 | 1.00 | 0.35 |
| Seawater | 10 | 2.11 | 0.07 | 0.18 | 0.17 | 0.99 | 1.71 |
| | 30 | 0.51 | 0.09 | 0.41 | 0.40 | 0.99 | 1.03 |
| | 50 | 0.58 | 0.11 | 0.43 | 0.41 | 0.99 | 1.60 |
| | 100 | 0.15 | 0.13 | 0.91 | 0.87 | 0.99 | 1.67 |

TABLE 10

Diffusion kinetic parameters for ammonium removal in both freshwater and seawater

| Water type | $NH_4^+$-N concentration (mg/L) | Film diffusion, $D_f$ (m²/min) | Particle diffusion, $D_p$ (m²/min) | Intraparticle transport, k (mg/g · min$^{0.5}$) |
|---|---|---|---|---|
| Fresh-water | 10 | 2.39 × 10$^{-11}$ | 8.58 × 10$^{-10}$ | 0.0003 |
| | 30 | 2.74 × 10$^{-11}$ | 9.97 × 10$^{-10}$ | 0.0109 |
| | 50 | 2.14 × 10$^{-11}$ | 7.75 × 10$^{-10}$ | 0.0116 |
| | 100 | 2.69 × 10$^{-11}$ | 1.05 × 10$^{-9}$ | 0.0271 |
| Sea-water | 10 | 2.38 × 10$^{-7}$ | 4.08 × 10$^{-15}$ | 0.0042 |
| | 30 | 6.08 × 10$^{-8}$ | 1.28 × 10$^{-15}$ | 0.0082 |
| | 50 | 6.13 × 10$^{-8}$ | 1.46 × 10$^{-15}$ | 0.0067 |
| | 100 | 5.12 × 10$^{-8}$ | 1.36 × 10$^{-15}$ | 0.0201 |

Ammonium Adsorption Isotherm Study

The study of adsorption isotherms can aid in the design and operation of ammonia removal systems. The obtained values for the isotherm model parameters using linear and non-linear regression in freshwater are listed in Table 11. All non-linear regressions had a better fit than the linear regressions (with higher $R^2$). This is reasonable because the alterations of the linear regression form have the tendency to create a higher error distribution (Karadag, Koc, et al., 2007; Foo and Hameed, 2010). The highest correlation was found in non-linear regression in the Sips isotherm, with an $R^2$ value of 0.99 and $\chi^2$ value of 0.01. The Sips isotherm is a combination of the Langmuir and Freundlich isotherms (Foo and Hameed, 2010). It is used to predict the heterogeneous adsorption systems by avoiding the limitations of the Freundlich isotherms (Gunay, Arslankaya, et al., 2007; Foo and Hameed, 2010). From the previously obtained adsorption kinetic result, we find that the ammonium adsorption onto chabazite was not a simple monolayer adsorption. The transmigration of ammonium ions happened on the surface of chabazite. Therefore, the Langmuir isotherm (monolayer adsorption isotherm (Dada, Olalekan, et al., 2012; Karadag, Koc, et al., 2007; Foo and Hameed, 2010)) is not the best isotherm model to predict this adsorption phenomenon. The Sips isotherm confirms that the ammonium adsorption onto modified chabazite under freshwater is a complex process that a simplified isotherm model is not able to predict the results.

TABLE 11

Adsorption isotherms parameters estimated by linear and non-linear regression in freshwater

| Isotherm | Parameters | Linear | Non-linear |
|---|---|---|---|
| Langmuir | $q_o$ | 10.83 | 11.10 |
| | b | 0.07 | 0.06 |
| | $R^2$ | 0.99 | 0.99 |
| | $\chi^2$ | — | 0.03 |
| Freundlich | K | 0.85 | 1.10 |
| | 1/n | 0.63 | 0.54 |
| | $R^2$ | 0.98 | 0.99 |
| | $\chi^2$ | — | 0.14 |
| Temkin | $b_t$ | 1195.21 | 1195.20 |
| | $A_t$ | 0.94 | 0.94 |
| | $R^2$ | 0.97 | 0.97 |
| | $\chi^2$ | — | 0.58 |
| Sips | $\beta s$ | 0.63 | 0.847 |
| | $a_s$ | 1.08 | 0.061 |
| | $K_s$ | 0.98 | 0.829 |
| | $R^2$ | 0.98 | 0.99 |
| | $\chi^2$ | — | 0.01 |

Nevertheless, the Langmuir isotherm still fits with experimental data with a high $R^2$ value of 0.99 and low $\chi^2$ value of 0.03. The $q_o$ value was determined to be 11.1 mg/g, which is smaller than the $q_o$ reported in other literature (Table 12). One probable reason for the low maximum ion adsorption capacity in this study was the testing protocol. In prior literature, batch reactors had constant mixing (Lahav and Green, 1998; Cyrus and Reddy, 2011) or were mixed 3-4 times daily (Leyva-Ramos, Monsivais-Rocha, et al., 2010). In this study, the mixing energy of chabazite and water was provided by water turbulence generated from aeration only, which is weaker compared with constant shaking. The second probable reason was the diversity of particle size. It has been found that smaller particle size would have higher ammonium adsorption capacity (Hedstrom, 2004; Cyrus and Reddy, 2011; Wen, Ho, et al., 2006).

TABLE 12

The maximum ammonium adsorption capacity ($q_o$) data for chabazite from other literature

| Size | Modification | Water type | $q_o$ (mg/g) | Reference |
|---|---|---|---|---|
| 1-2 mm | Freshwater | Freshwater | 11.10 | Current study |
| 0.18 mm | No | — | 32.20 | (Leyva-Ramos, Monsivais-Rocha, et al., 2010) |
| 0.18 mm | NaCl | — | 37.24 | (Leyva-Ramos, Monsivais-Rocha, et al., 2010) |
| — | No | Secondary wastewater | 41.50 | (Lahav and Green, 1998) |
| 1 mm | No | Swine wastewater | 10.84 | (Cyrus and Reddy, 2011) |
| 2-4 mm | No | Swine wastewater | 10.28 | (Cyrus and Reddy, 2011) |

Table 13 lists the obtained isotherm parameters using linear and non-linear regression in seawater. Non-linear models were better than linear models in this case. Under seawater conditions, both Temkin and Sips isotherms fit the experimental data, with an $R^2$ value of 0.94 and an $\chi^2$ value of 0.01. The Temkin isotherm includes a factor that takes into account the interaction of adsorbent and adsorbate (Dada, Olalekan, et al., 2012). In consideration of the characteristics of the Sips and Temkin isotherms, it is clear that the ammonium adsorption in seawater is complex. The non-linear Langmuir isotherm also had a relatively good fit with the an $R^2$ of 0.92 and an $\chi^2$ of 0.03. The maximum ammonia adsorption capacity ($q_o$) in seawater was 7.80 mg/g. This low value also reveals that strong competing ion competition occurred during the adsorption process in seawater. Zeolite used to remove ammonia is seldom studied in marine water due to the competing ions present. However, in this study, the ammonium removal efficiency was 48.6±5.91%, which is much higher than 18.1±2.47% reported by Miladinovic et. al. (Miladinovic, Weatherley, et al., 2004) and 18% reported by Burgess et. Al. (Burgess, Perron, et al., 2004). Emadi et al. also reported an ammonium removal efficiency of 58.8% when the initial $NH_4Cl$ was 5 mg/L (Emadi, Nezhad, et al., 2001); however, in their study, NaCl was used instead of synthetic seawater. This will eliminate many other competing ions such as $Ca^{2+}$, $K^+$, and $Mg^{2+}$.

TABLE 13

Adsorption isotherms parameters estimated by linear and non-linear regression in seawater

| Isotherm | Parameters | Linear | Non-linear |
|---|---|---|---|
| Langmuir | $q_o$ | 38.91 | 7.80 |
|  | b | 0.001 | 0.006 |
|  | $R^2$ | 0.024 | 0.92 |
|  | $\chi^2$ | — | 0.03 |
| Freundlich | K | 0.027 | 0.11 |
|  | 1/n | 1.038 | 0.72 |
|  | $R^2$ | 0.92 | 0.90 |
|  | $\chi^2$ | — | 0.06 |
| Temkin | $b_t$ | 1674.68 | 1674.70 |
|  | $A_t$ | 0.082 | 0.082 |
|  | $R^2$ | 0.94 | 0.94 |
|  | $\chi^2$ | — | 0.001 |
| Sips | $\beta s$ | 1.038 | 1.86 |
|  | $a_s$ | 2.95 | 0.001 |
|  | $K_s$ | 0.08 | 0.003 |
|  | $R^2$ | 0.92 | 0.94 |
|  | $\chi^2$ | — | 0.01 |

Regeneration Efficiency Studies

FIG. 9 shows the ammonium adsorption capacity comparison between original and regenerated chabazite. In the case of freshwater, the ammonium adsorption capacity ($q_e'$) was decreased after regeneration. The RE of $RE_{40}$ was 72%~88%, and the RE of $RE_{80}$ was 38%~80%. In terms of seawater, the ammonium adsorption started to have an interesting change. When $RE_{40}$ was used to remove 10 mg/L $NH_4^+$—N, ammonium desorption occured. The most probable reason is the presence of competing ions in seawater. Since seawater has a very high concentration of $Na^+$, the ion exchange process went from right to the left (Eq. 19) and caused more release of $NH_4^+$—N.

$$\text{Chabazite-Na}^+ + X^+ \leftrightarrow \text{Chabazite-}X^+ + \text{Na}^+ \quad (5)$$

Materials and Methods

Chabazite Modification

Chabazite was purchased from St. Cloud Mining Inc. (Winston, NM). The grain size range was 1-2 mm. All natural chabazite (NC) grains were washed with deionized (DI) water to remove extremely small particles and dried in an oven at 110° C. All washed chabazite was stored in a sealed plastic bottle at room temperature. Freshwater modified chabazite (FC) was made using NC soaked in synthetic freshwater (Table 6). The suspension was shaken using a shaking table for 24 hours. The FC particles were then washed with DI water and dried at 110° C. before use. Seawater modified chabazite (SC) was made from NC soaked in 117 g/L NaCl (2M). The suspension was shaken using a shaking table for 24 hours. The SC particles were then washed with DI water and dried at 110° C. before use.

Chabazite Regeneration

All used chabazite was oven dried, mixed, and stored separately in covered containers. During the regeneration process, 30 g of used chabazite was immersed in 200 mL of NaCl solution with pH controlled at 7. The NaCl concentrations were 0 g/L ($RE_0$), 40 g/L ($RE_{40}$), and 80 g/L ($RE_{80}$), respectively. The suspension was shaken for varying periods of time and then separated from the supernatant. Aqueous samples were collected from the supernatant to measure desorbed $NH_4^+$—N concentrations. Each test was performed in triplicate. Regenerated chabazite was washed with DI water and then dried at 110° C. before use.

Chemicals and Measurement Methods

All ammonia solutions were prepared using crystalline $NH_4Cl$ (Fisher Scientific, Pittsburgh, PA). Ammonia concentration was measured using a high-performance ammonia ion selective electrode (Fisher Scientific, Pittsburgh, PA). The pH value was measured using a pH meter (Denver Instrument Model 250, Bohemia, NY). Concentrations of $Na^+$, $K^+$, $Ca^{2+}$ and $Mg^{2+}$ were measured using a Metrohm 881 Compact IC Pro (Herisau, Switzerland) ion chromatography system. Alkalinity was measured using Standard Method 2320B.

The compositions of synthetic freshwater and seawater are listed in Table 6. The freshwater used in this study was obtained from Simmons Park at the University of South Florida, FL (Average pH=8.49, alkalinity=62.09 mg/L). The composition of synthetic freshwater was obtained from Villavicencio et al. The synthetic seawater was prepared based on the instructions of Instant Ocean™ (Blacksburg, VA, US). The measured alkalinity of synthetic freshwater and seawater were 0.31 g/L and 0.24 g/L, respectively.

Chabazite Characterization

The chemical composition of natural chabazite were investigated using a Scanning Electron Microscope with Electron Energy-dispersive X-ray spectroscopy (SEM-EDS, Hitachi, Japan). Chabazite was also characterized by comparing the chemical composition and crystalline structure before and after treatment. Chemical composition tests were performed in three 50 mL volumetric flasks. Flasks were filled with 50 mL DI water, synthetic freshwater and 2M NaCl, respectively. The chabazite was pretreated in each flask following the previously described pre-treatment procedure. When pre-treatment was completed, water was collected and filtered. The crystalline structure of chabazite before and after treatment was tested using X-Ray Diffraction (Panalytical, Westborough, MA).

Ammonium Adsorption Kinetic and Batch Equilibrium Studies

Bench scale kinetic studies were conducted at room temperature using four 1000 mL containers filled with an ammonium solution. An air pump was used to simulate mixing conditions in fresh caught fish and transportation systems. Initial concentrations of NH$_4$Cl were 30, 75, 150, 300 mg/L. The NH$_4$Cl solution was prepared in either synthetic freshwater or seawater. The amount of chabazite was 30 g in each container. Samples were taken every hour until equilibrium was observed.

Adsorption Kinetics

Pseudo-first order and second-order kinetic models were used to analyze the data using the linear forms of Eq. (6) and (7) (Yusof, Keat, et al., 2010; Alshameri, Ibrahim, et al., 2014):

$$\ln(q_e - q_t) = \ln q_e - k_1 t \quad (6)$$

$$\frac{t}{q_t} = \frac{1}{k_2 q_e^2} + \frac{1}{q_e} t \quad (7)$$

$$q_e = (C_0 - C_e) \frac{V}{m} \quad (8)$$

where the variables $q_t$ and $q_e$, represent the amount of ammonium adsorbed (mg/g) at any time t (min) and at equilibrium, respectively; $k_1$ (/min) and $k_2$ (g/mg·min) are the pseudo first-order and second-order adsorption rate constants, respectively; V is the solution volume (L), and m is the chabazite mass (g). The least squares method was applied to predict the best-fit linear solution and parameter values. The initial adsorption rate, h (mg/g·min) at t→0, is defined as:

$$h = k_2 q_e^2 \quad (9)$$

The best fit model was chosen based on the determination coefficient ($R^2$). The fitness of the kinetic models to the experimental data was evaluated by the error index of Marquardt's standard deviation percentage ($\Delta q$) which is written as (Ahmaruzzaman and Laxmi Gayatri, 2010):

$$\Delta q\ (\%) = \sqrt{\frac{\sum [(q_{e,exp} - q_{e,cal})/q_{exp}]^2}{n-1}} \times 100 \quad (10)$$

where n is the number of data points and $q_{e,exp}$ and $q_{e,cal}$ (mg/g) are the experimental and calculated adsorption capacity, respectively.

To better understand the specific adsorption mechanisms involved in the adsorption process, it is necessary to use a molecular diffusion model. The kinetic data can be further fitted with the film diffusion model and a particle diffusion model (Yusof, Keat, et al., 2010):

$$\text{Film diffusion model } \ln\left(1 - \left(\frac{q_t}{q_e}\right)\right) = -k_f t \quad (11)$$

$$\text{Particle diffusion model } \ln\left(1 - \left(\frac{q_t}{q_e}\right)^2\right) = -2k_p t \quad (12)$$

where $k_f$ (hr) and $k_p$ (hr) are the film and particle rate constants, which are calculated from:

$$k_f = D_f \frac{c}{c_z} hr \quad (13)$$

$$k_p = D_p \frac{\pi^2}{r^2} \quad (14)$$

where the C and $C_z$ (mg/g) are concentrations of NH$_4^+$—N in the solution and in the chabazite, respectively, D is the diffusion coefficient (m$^2$/min), r is the grain radius of chabazite (m), and h is the thickness of film around chabazite particles (10$^{-6}$ m for poorly stirred solution).

The experimental adsorption kinetic data can also be analyzed using the Morris-Weber equation:

$$q_t = k t^{0.5} + C \quad (15)$$

where k is the coefficient of intraparticle diffusion (mg/g·min$^{0.5}$).

Adsorption Isotherm Studies

Four isotherm models: Langmuir, Freundlich, Temkin, and Sips were studied to describe the solid-liquid adsorption data (Table 14). The parameters and the thermodynamic assumptions of these equations describe the sorption mechanisms, surface properties and affinities of the sorbents in detail (Ho, Chiu, et al., 2005).

TABLE 14

Non-linear and Linear forms of Langmuir, Freundlich, Temkin, and Sips isotherm models.

| | Non-linear form | Linear form |
|---|---|---|
| Langmuir | $q_e = \dfrac{q_o \cdot b \cdot C_e}{(1 + b \cdot C_e)}$ | $\dfrac{C_e}{q_e} = \dfrac{1}{q_0} \cdot C_e + \dfrac{1}{q_0 \cdot b}$ |
| Freundlich | $q_e = K \cdot C_e^{\frac{1}{n}}$ | $\log q_e = \log K + \dfrac{1}{n} \cdot \log C_e$ |
| Temkin | $q_e = \dfrac{RT}{b_t} \ln(A_t \cdot C_e)$ | $q_e = \dfrac{RT}{b_t} \ln A_t + \dfrac{RT}{b_t} \ln C_e$ |
| Sips | $q_e = \dfrac{K_s \cdot C_e^{\beta s}}{1 + a_s \cdot C_e^{\beta s}}$ | $\beta_s \ln C_e = -\ln\left(\dfrac{K_s}{q_e}\right) + \ln(a_s)$ |

In Table 14, $q_e$ is the equilibrium amount of ammonium adsorbed (mg/g), which is experimentally determined from the difference between the initial concentration, $C_0$ (mg/L), and the final NH$_4^+$—N concentrations, $C_e$ (mg/L), at equilibrium using Eq. (10), $q_o$ is the maximum monolayer adsorption capacity (mg/g), b is the Langmuir adsorption constant of NH$_4^+$—N(L/mg) (Foo and Hameed, 2010). K is the Freundlich adsorption capacity parameter ((mg/g)(L/mg)$^{1/n}$), 1/n is the Freundlich adsorption intensity parameter (unitless), R is the universal gas constant (8.314 J/mole K), T is the absolute temperature during the experiment (296K), $b_t$ is the Temkin constant (J/mole), and $A_t$ is the Temkin isotherm equilibrium binding constant (L/g) (Foo and Hameed, 2010), $K_s$ and $a_s$ are the Sips isotherm model constant (L/g), and $\beta_s$ is the Sips model exponent (Foo and Hameed, 2010).

The least square method was used to calculate all isotherm parameters. In the linear regression model, a linear coefficient of determination, $R^2$, was used to examine the accuracy of the model fit. The non-linear regression was established by iterative non-linear least square fitting using the solver add-in in Microsoft Excel (Brown, 2001). The coefficient of determination, $R^2$, and chi-square, $\chi^2$ tests were used to evaluate the fit of the non-linear isotherm to the experimental data. The equivalent mathematical statement of chi-square is:

$$\chi^2 = \sum \frac{(q_e - q_{e,m})^2}{q_{e,m}} \quad (16)$$

where $q_{e,m}$ is the equilibrium capacity obtained by the model (mg/g). If $\chi^2$ is a small number, the data from the model are similar to the experimental data; if $\chi^2$ is large, the model data are different from the experimental data (Ho, Chiu, et al., 2005).

Regeneration Efficiency Studies

The regeneration efficiency (RE) of chabazite was calculated using Eq. (17):

$$RE\ (\%) = \frac{q_{e'}}{q_e} * 100 \qquad (17)$$

where $q_e'$ (mg/g) is the amount of ammonium absorbed by the regenerated chabazite at equilibrium.

CONCLUSION

Ammonium removal by chabazite in either freshwater or seawater was studied. There were no structural changes of chabazite after being modified by synthetic freshwater or sodium chloride. Experimental kinetic data suggests that ammonium removal follows a pseudo-second-order reaction model, indicating that ammonium sorption in chabazite follows two steps. The diffusion model shows that film diffusion is dominant in the ammonium sorption in freshwater, while pore diffusion dominated ammonium sorption in seawater. The isotherm studies showed that non-linear regression has the best fit for ammonia removal in both freshwater and seawater. The Sips isotherm indicates that the ammonium adsorption is not a simple process that can be described by only one simplified isotherm. The regenerated chabazite has lower ammonium removal capacity than original chabazite in freshwater, while in seawater, ammonium desorption was found when the initial ammonium concentration was low.

The disclosures of all publications cited above are expressly incorporated herein by reference, each in its entirety, to the same extent as if each were incorporated by reference individually.

It is also to be understood that the following claims are intended to cover all of the generic and specific features of the invention herein described, and all statements of the scope of the invention which, as a matter of language, might be said to fall there between. Now that the invention has been described,

What is claimed is:

1. A method of controlling an ammonia level in a water environment comprising:
    adding an amount of a water conditioner to the water environment wherein the water conditioner comprises:
        an amount of sodium formaldehyde bisulfite;
        an amount of cornstarch;
        an amount of dye; and
        an amount of alcohol.

2. The method of claim 1, further comprising replacing at least ⅔ of water in the water environment with refill water daily.

3. The method of claim 1, further comprising adding an ammonia removal agent comprising:
    a freshwater or seawater modified chabazite compound and an amount of a phosphate buffer.

4. The method of claim 1, wherein the water conditioner is added at least once per day.

5. The method of claim 1, wherein a total amount of water conditioner added to the water environment per day is less than or equal to 1 g/L.

6. The method of claim 1, wherein the water environment is contained within a fish storage system.

7. The method of claim 6, wherein the water conditioner is first added to the storage system within 3 hours of fish being contained within the storage system.

8. The method of claim 1, wherein the amount of sodium formaldehyde bisulfite is about 10 g, the amount of cornstarch is about 1 g, the amount of dye is about 0.15 g, and the amount of alcohol is about 1 mL.

* * * * *